No. 713,602. Patented Nov. 18, 1902.
C. CHARLOPIN.
METHOD OF PRODUCING PURE OXYGEN.
(Application filed Apr. 5, 1899.)
(No Model.) 3 Sheets—Sheet 1.
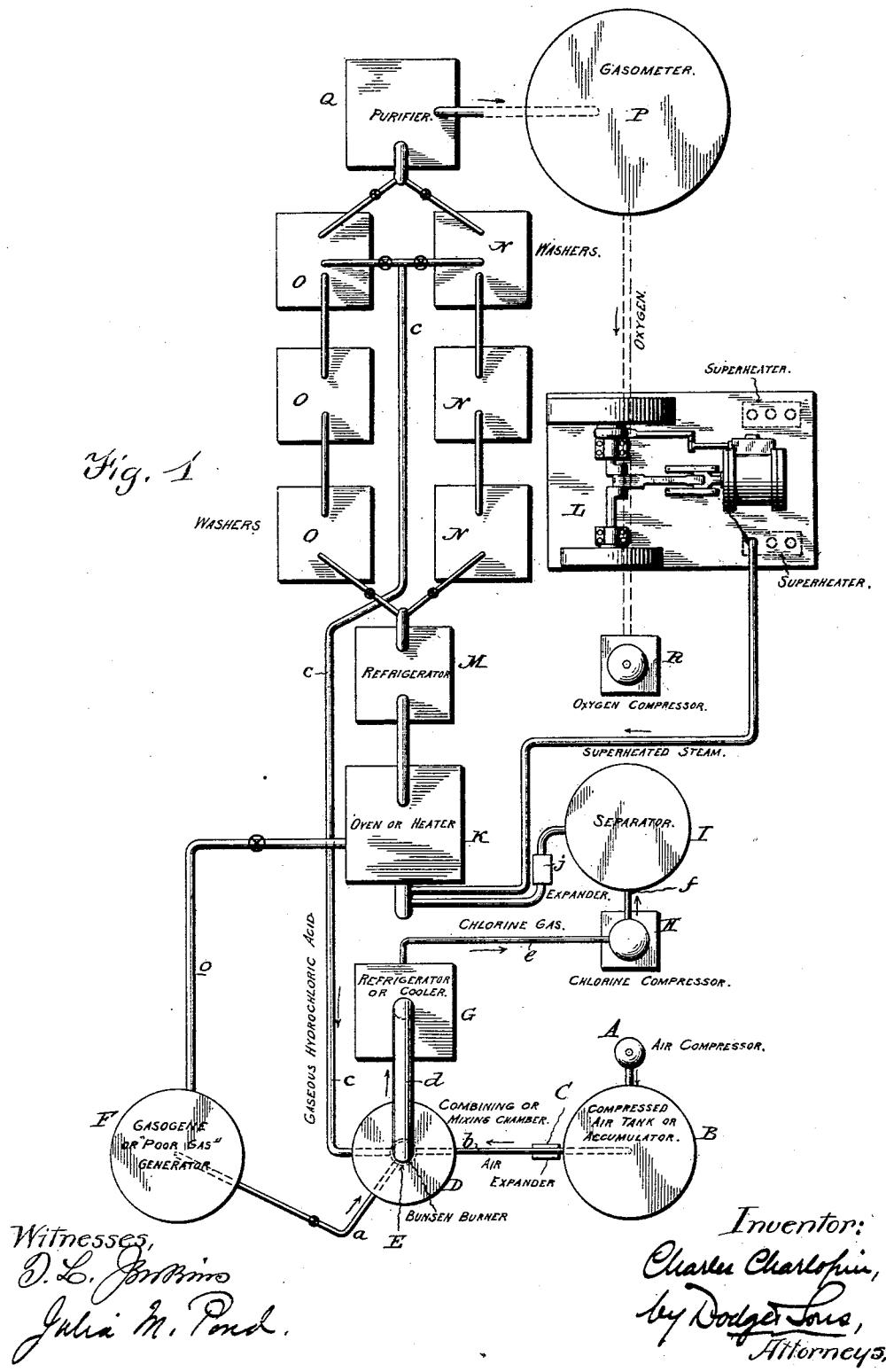

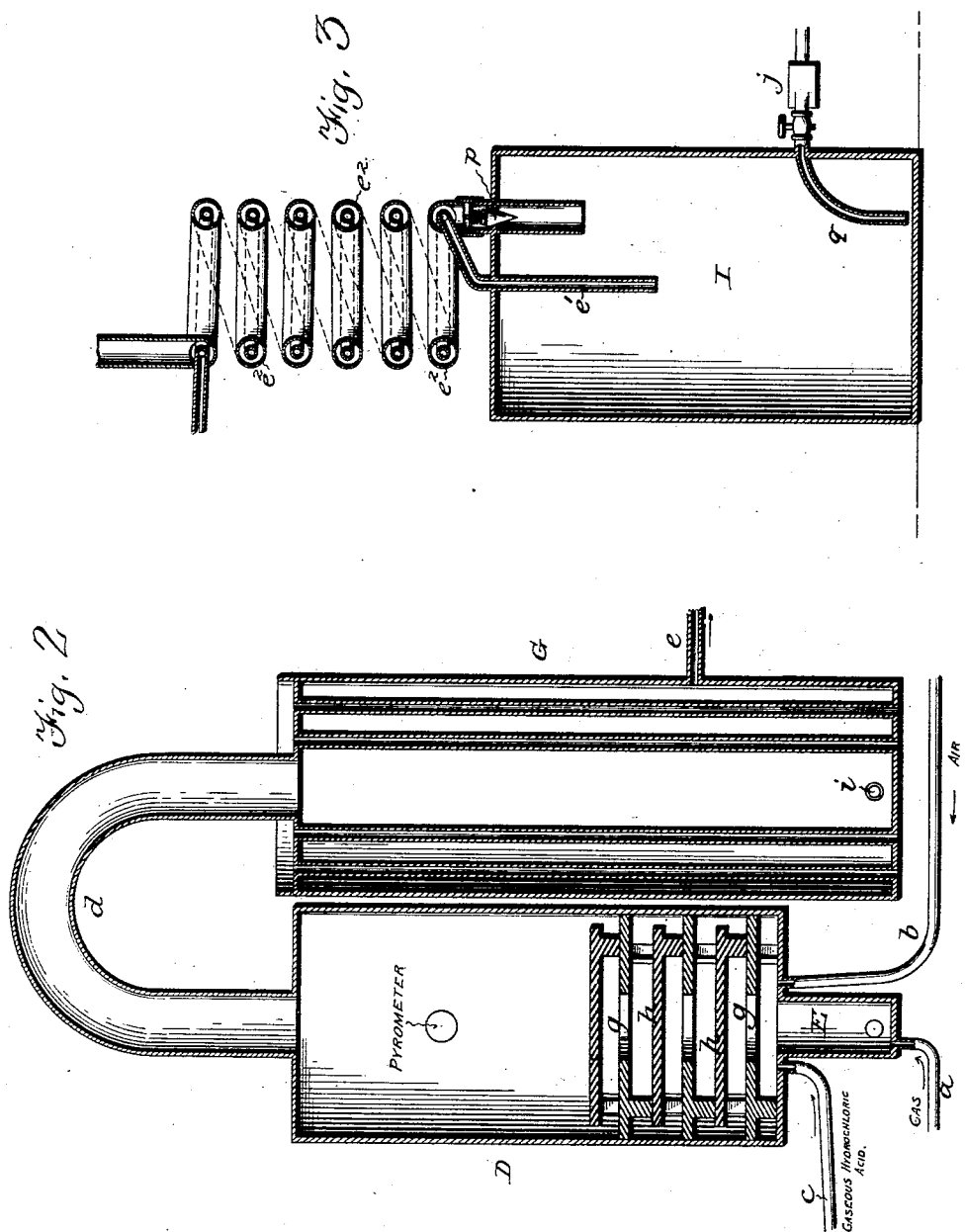

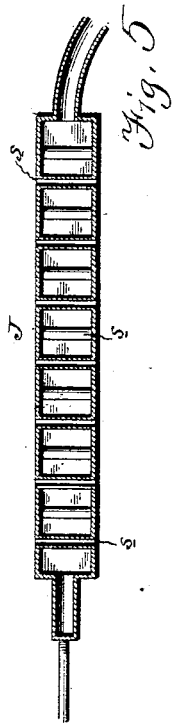

UNITED STATES PATENT OFFICE.

CHARLES CHARLOPIN, OF PARIS, FRANCE.

METHOD OF PRODUCING PURE OXYGEN.

SPECIFICATION forming part of Letters Patent No. 713,602, dated November 18, 1902.

Application filed April 5, 1899. Serial No. 712,240. (No specimens.)

*To all whom it may concern:*

Be it known that I, CHARLES CHARLOPIN, residing at Paris, Republic of France, have invented a new and useful Art or Method of Producing Pure Oxygen with an Invariable Weight of Hydrochloric Acid, (for which I have obtained a patent in Belgium, No. 137,832, bearing date September 8, 1898,) of which the following is a specification.

My invention pertains to the manufacture of pure oxygen, and has for its object the cheap production thereof in large quantities and of great purity.

The process consists in introducing into a mixing or combining chamber gaseous hydrochloric acid and air, both under suitable compression, and causing them to meet and mingle with a relatively poor gas, such as Dawson gas, at the combustion-level of a Bunsen burner, the mingled gases and products of combustion passing thence in a circuitous path through the chamber in contact with porous bodies charged with copper chlorid. A reaction is set up by the mingled gas and air coming into contact with the copper chlorid, resulting in the formation or presence of pure chlorin gas, steam, and a copper salt, together with a volume of air and nitrogen gas. The mingled gases are delivered to a condenser wherein the steam condenses and forms water, in which any hydrochloric acid present is dissolved. The other gases (chlorin, nitrogen, and air) are drawn off by a suitable suction apparatus and forced into a separator, in which they are held under a pressure of from eight to ten atmospheres, which causes the chlorin to be liquefied and to fall to the bottom of the separator, while the remaining gases, continuing unliquefied, are permitted to escape to the atmosphere through a suitably-weighted valve. The liquefied chlorin is next delivered, together with superheated steam, to a mixing-chamber, which it enters in gaseous form, being itself expanded and superheated on its way thereto. The superheated steam and chlorin gas are intimately commingled and heated and set up a reaction, which results in the production of hydrochloric acid and pure oxygen. The hydrochloric acid and oxygen, both in gaseous form, are delivered to a washer, in which the hydrochloric acid is dissolved under pressure, while the pure oxygen thus set free or separated is delivered to a gasometer or holder, from which it is drawn as required, compressed, and delivered to the trade. The hydrochloric-acid gas is permitted to expand and separate from the water or solvent used in the washers and is returned to the first combining or mixing chamber, where it unites with the compressed air at the Bunsen burner, the entire cycle or series of operations being repeated.

The invention may be more clearly explained in connection with the accompanying drawings, representing the apparatus employed, the drawings being in greater or less degree conventional and designed merely to make clear the mode of procedure.

In the drawings, Figure 1 is a plan view or diagrammatic elevation of the plant as a whole; Fig. 2, a sectional elevation of the combining or mixing chamber; Fig. 3, a sectional elevation of the separator; Fig. 4, a sectional elevation of the cooler or refrigerator; Fig. 5, a longitudinal sectional view of the chamber in which the chlorin and superheated steam are intercommingled and heated; Fig. 6, a perspective view of a portion of the same, and Fig. 7 a sectional elevation of the oven in which said chamber is mounted.

Referring first to the general plan view Fig. 1, A indicates an air-compressor which forces air into an accumulator or compressed-air tank B, maintaining therein suitable compression, whence it is delivered, subject to the action of an "expander" C in the nature of a pressure-regulating device, to a combining or mixing chamber D. The compressor and tank A and B are or may be of common construction, as also the pressure-regulator, the purpose being to maintain a delivery of air at uniform pressure into the combining or mixing chamber D. Into the base or bottom of said chamber D, which chamber is shown in detail in Fig. 2, opens the upper end of a Bunsen burner E, which receives gas from a water-gas generator or gazogene F. The gas enters at the bottom of the burner-cylinder E through a pipe $a$ and rising to the top of the burner meets at one side a supply of air coming from the compressed-air tank B through a pipe $b$ and at the other side a supply of gaseous hydrochloric acid, delivered through a pipe c from washers, hereinafter referred to.

The employment of an air-compressor is necessary in order to insure the supply of an adequate quantity of air, and the expander is used for the purpose of maintaining a constant air-pressure. By adjusting the expander or setting it to maintain a greater or less opening the pressure of air delivered to the chamber D may be varied at will.

Referring now to Fig. 2, the construction and arrangement of the combining or mixing chamber D will be described. This chamber is advisably constructed in cylindrical form of bricks or glazed gritstone, with an opening at the bottom for the Bunsen burner, as already mentioned, and with a second opening at the top for the escape of gases. A pipe $d$ of like material extends from the top of chamber D to the upper end of a cooler or condenser G, which is constructed in much the same way as a tubular boiler. It comprises an outer shell or casing of gritstone, bricks, or cement, preferably iron-rust cement, with upper and lower heads connected by pipes or tubes of glass, porcelain, or gritstone designed to carry through them water or other cooling medium. The gases and vapors entering the cooler or condenser G through the pipe $d$, as hereinafter more fully explained, become cool and the steam or water-vapor becomes condensed, the chlorin (with air and other gases present, but undissolved) being drawn off from chamber G through a pipe $e$ into a compressor H, wherein the chlorin is compressed and by which it is delivered by a pipe $f$ into a separator I. Within the mixing or combining chamber D are arranged deflectors $g$ and $h$, consisting, respectively, of annular and disk-shaped plates provided with feet or supporting-lugs and superposed one upon another. The annular members are of a diameter equal or practically equal to the interior diameter of the chamber D, while the disk-shaped members are of somewhat less diameter, as will be readily seen upon reference to Fig. 2. By this arrangement the mingled air, gases, and vapors entering by the pipes $a$ $b$ $c$ and incident to the combustion at the burner E pass upward in a zigzag path through the chamber D and in contact with the guards or deflectors $g$ and $h$. These guards or deflectors, which are commonly called "bricks" in the art, are of baked clay or like material and are saturated or impregnated with a strong copper-chlorid solution, the upper side of each being also covered with a coating of copper chlorid. In consequence of the arrangement of parts thus described and shown the gases and vapors pass through the lowermost guard or deflector, strike the second, pass thence outward around the periphery thereof, thence inward to the central opening of the next guard or deflector above, and so on through the entire series, which may extend to the top of the chamber or to any desired point therein. The mixture of hydrochloric-acid gas and air reacts upon the copper chlorid in the chamber B, thus forming pure chlorin gas, steam, and a copper salt, together with a volume of air and nitrogen gas. The mingled gases and steam or vapor pass through the pipe $d$ into a cooler or condenser G, as above mentioned. At or near the base of the cooler or condenser G is a draw-off pipe $i$, controlled by a valve and through which the water due to condensation of the steam in chamber G is withdrawn, together with any hydrochloric acid present, the latter being dissolved in and carried by the water. The chlorin gas, cooled and separated from the steam through the condensation of the latter, is withdrawn from chamber G through a pipe $e$ by the suction of a compressor H, which delivers the gases (chlorin, nitrogen, and air) into a separator I, maintaining therein a pressure of from eight to ten atmospheres. The chlorin is liquefied and precipitated in the separator I, the remaining gases continuing unliquefied and being permitted to escape through suitable outlet to the atmosphere.

The construction of the separator is illustrated in Fig. 3, where it will be seen to consist, essentially, of a chamber, which may be conveniently of cylindrical form, at the top of which enters a pipe $e'$, which above and before entering the chamber takes a spiral or serpentine form and is surrounded by a second serpentine pipe or coil $e^2$ of larger diameter, as shown in Fig. 3. The lower end of the outer pipe $e^2$ likewise opens into the chamber of the separator I and is provided with a valve $p$, which is held to its seat with a spring-pressure determined by adjustment of a nut on its stem or by suitable weighting. The valve, which may be any well-known type of pressure-regulating valve, may be made accessible by a sleeve or coupling or in any other convenient way to permit of its ready adjustment to open at predetermined pressure. Near the bottom of the chamber I and extending downward therein is a pipe $q$, provided with a cock or valve and with an expander or automatic pressure-reducing valve $j$, through which the chlorin is delivered under suitable pressure to a superheater contained within an oven K, in which is also located a mixing-chamber J, the liquid chlorin expanding and taking on a gaseous form in the superheater or on its way thereto. The valve $p$ of chamber I is the outlet above mentioned, through which the unliquefied gases and the air escape, and their rapid expansion in the outer coil effects the cooling and facilitates or effects condensation of the incoming chlorin gas.

The oven (better shown in Fig. 7) is advisably of brick construction, low, and of the reverberatory type. It contains within it a superheater for the chlorin, which may conveniently be made in the form of a coil or manifold $l$, lying in the body of the furnace upon cross-bars $m$, of porcelain, or other suitable support and above a perforated pipe n or other form of burner, receiving gas from the generator F through a pipe o, provided with the usual cock or controlling-valve. Above the superheater is arranged the mixing-chamber J, before mentioned, which, as best seen in Figs. 5 and 6, consists, primarily, of a rectangular box or chamber of porcelain or glazed gritstone. Extending from the upper to the lower wall of this chamber are pipes or tubes s, of porcelain or glazed gritstone, forming flues. These pipes or flues are arranged in zigzag order or in alternation, so that the mixture of steam and chlorin entering the chamber shall be caused to strike against the pipes in its travel through the chamber and be thereby broken up and intimately commingled, so as to effect a complete and perfect intercommingling and combination.

Superheated steam is introduced into the mixing-chamber J simultaneously with the chlorin from separator I, the steam being either the exhaust-steam of an engine L, which furnishes the power for the plant, or steam from other convenient source superheated in any usual way. In the drawings, Fig. 1, I have represented a superheater arranged in the ash-pit or in the fire-box of the boiler which supplies an engine L by which the several compressors of the plant are operated, and power is furnished for other uses in and about the plant. It has not been deemed necessary in these drawings to show the connections between the engine and the different parts of the apparatus driven or operated thereby, as these may be arranged in any usual or convenient way. The superheated chlorin and superheated steam meeting and mingling in the mixing-chamber J set up a reaction which produces hydrochloric acid and pure oxygen. These two gases passing from the mixing-chamber K enter a cooler or refrigerator M of the construction shown in Fig. 4. As there shown, the form is analogous to that of a vertical tubular boiler, the tubes serving for the passage of the gases from top to bottom, whence they go by an outlet-pipe u to washers N or O, arranged in two parallel series and so coupled and connected as to be used in alternation, if desired. In these washers the hydrochloric acid is dissolved under pressure, and the pure oxygen is set free and delivered to a gasometer or holder P, preferably passing first through a purifier Q, located between the washers and the gasometer. From the gasometer gas is withdrawn by a compressor R, the suction-pipe of which communicates with said gasometer, and it is therein compressed and stored in suitable holders or receivers for delivery to the trade. The hydrochloric acid is allowed to resume its gaseous form and passes from the washers by the pipe c back to the upper end of the Bunsen burner of combining or mixing chamber D, furnishing the supply necessary for use in a repetition of the cycle above described.

It is important in carrying out the process that the quantity of air delivered, as also the quantity of chlorin, be kept constant or uniform after the proper proportion is once established, and it is for this purpose that the expanders or pressure-regulators are provided. The air will be supplied in excess of the quantity actually required in the mixture and for the production of the pure chlorin, the surplus being subsequently eliminated, this for the reason that any shortage would result in failure to attain satisfactory results. So, too, it is essential that proper temperature be maintained in the mixing-chamber D and in the oven K. This object is attained by employment of a suitable valve-actuating mechanism controlled by the temperature in the respective chambers D and K. Inasmuch as this apparatus is well understood and as it constitutes no part of the present invention, the apparatus as a whole being represented and described merely for greater facility of explaining the process of manufacture, it is not deemed necessary to show or describe in detail this regulating mechanism. I prefer, however, to use the thermo-electric pyrometer of M. Lechatelier. This apparatus serves upon the occurrence of a given temperature for which it is adjusted to carry into contact with a terminal of a suitable electric conductor a hand or pointer which, completing the supply-circuit of an electric motor, causes the motor to operate and to close or open the regulating-cock in the supply-pipe by which the fuel-gas is delivered to the chamber. In this way a uniform temperature is maintained.

The chlorin-compressor, which will be of usual construction, as also the pipes and attachments, should be of a character to withstand the action of acids.

The separator I is preferably an enameled iron tank of cylindrical form and of strength sufficient to withstand the pressure above indicated with due margin for safety.

The temperature to be maintained in the mixing or combination chamber D is approximately 400° centigrade, and the pyrometric circuit-closer should effect a closing of the circuit or call into action the mechanism for adjusting the valve upon variation of, say, 20° above or below the stated temperature.

The superheated steam delivered to the mixing-chamber J is supplied at a temperature of from 700° to 800° centigrade, and for this purpose I find it convenient to use the superheater devised by M. Cestius de Beauregard, which is quite well known in the art, hence need not be described. Any other efficient superheater may be used, however.

Having now particularly described and ascertained the nature of my said invention and in what manner the same is to be performed, I declare that what I claim is—

1. The herein-described method of producing oxygen, which consists in the following steps or operations: first, producing hydrochloric-acid gas; second, compressing a volume of air; third, forcing hydrochloric-acid gas and compressed air into a mixing-chamber and subjecting the same to heat in the presence of copper chlorid, whereby the mixture of hydrochloric-acid gas and air is caused to react with the copper chlorid, thus forming pure chlorin gas, steam, and a copper salt, together with a volume of air and of nitrogen gas; fourth, delivering the mingled gases to a condenser wherein the steam condenses and any hydrochloric acid present is dissolved by the resulting water, the other gases being drawn off by a suction apparatus and forced under a pressure of from eight to ten atmospheres into a separator, wherein the chlorin is liquefied and precipitated, the remaining gases being permitted to escape into the atmosphere; fifth, withdrawing the liquefied chlorin from the separator and delivering it in a gaseous state to a mixing-chamber containing superheated steam, thereby effecting a reaction between the chlorin and the steam, and producing hydrochloric acid and pure oxygen; and lastly, delivering the two gases to a washer wherein the hydrochloric acid is dissolved under pressure and the pure oxygen is set free preparatory to its delivery to a gasometer or holder.

2. The continuous process of producing pure oxygen, which comprises the following steps: first, producing hydrochloric-acid gas unmixed with water or sulfuric acid; second, compressing air; third, introducing the hydrochloric-acid gas and air into a mixing-chamber and there subjecting them to heat in the presence of copper chlorid; fourth, delivering the mingled gases and steam incident to reaction of the hydrochloric-acid gas and air with the copper chlorid into a condenser, wherein the steam condenses and dissolves the hydrochloric acid; fifth, withdrawing the other gases (chlorin, air and nitrogen) and forcing them under pressure into a separator, thereby liquefying the chlorin and precipitating the same; sixth, discharging the remaining gases; seventh, delivering the liquefied chlorin in gaseous form from the separator to a mixing-chamber containing superheated steam, and thereby producing through the resulting reaction hydrochloric acid and pure oxygen; and lastly, passing said gases to a washer, dissolving the hydrochloric acid under pressure, delivering the pure oxygen to a gasometer or holder, and repeating the several steps or operations.

3. The art or continuous process of manufacturing pure oxygen in quantities, which consists in dissolving hydrochloric acid under pressure to separate it from other agents; introducing the hydrochloric acid in gaseous form together with an excess of compressed air, into a chamber containing copper chlorid, both the gas and the air being superheated, whereby chlorin and other gases are produced; separating the chlorin from the other gases by subjecting it to liquefying pressure; mixing the chlorin so obtained with superheated steam to obtain oxygen, and finally separating the oxygen from the hydrochloric acid by dissolving the latter.

In testimony whereof I have hereunto signed my name in presence of two subscribing witnesses.

CHARLES CHARLOPIN.

Witnesses:
JEAN JOSEPH BERNARD.
EDWARD P. MACLEAN.